Figure 1:
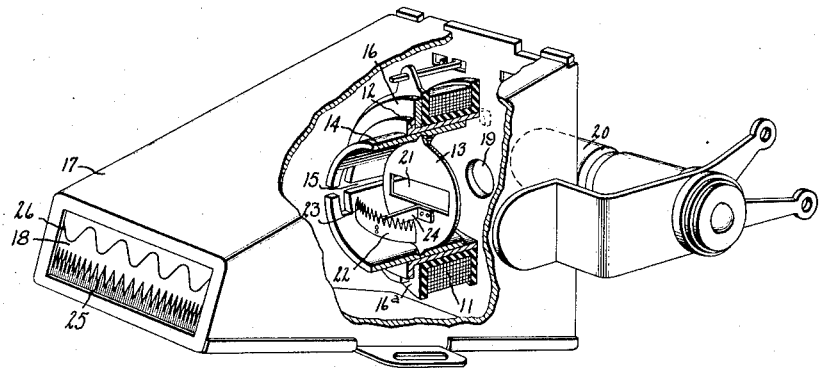

Sept. 17, 1935.    R. G. AREY    2,014,960

SHADOW TUNING INSTRUMENT

Filed Feb. 10, 1934

Inventor:
Ralph G. Arey,
by Harry E. Dunham
His Attorney.

Patented Sept. 17, 1935

2,014,960

UNITED STATES PATENT OFFICE 2,014,960

SHADOW TUNING INSTRUMENT

Ralph G. Arey, Swampscott, Mass., assignor to General Electric Company, a corporation of New York Application February 10, 1934, Serial No. 710,669

9 Claims. (Cl. 177—311)

My invention relates to indicating instruments and is particularly useful in connection with tuning instruments to give a visual indication of the process of tuning and of the tuned condition when obtained. My invention, however, is not limited to use as a tuning indicator and certain aspects of the invention are generally applicable to various other uses.

An important aspect of my invention relates to improvements in instruments comprising an indicating mechanism, a light source, and a translucent screen, between which is placed shutter means actuated by the movable element of the measuring instrument and arranged to cause a shadow or projection effect on the screen.

The present invention relates to a modification of the apparatus disclosed in my application, Serial No. 633,983, filed September 20, 1932, and assigned to the same assignee as the present application. The indication is produced by the passage of certain forms across the translucent screen or the coming to rest of these forms. A wide variety of effects may be obtained by changes in the size, shape, and character of the shutter and the extent and rapidity of the movement may be magnified to any desired extent by positioning the shutter nearer the light source.

It is an object of my invention to provide a tuning device in which the same indication will be obtained regardless of the strength or distance of the transmitting station for the signals of which a radio receiver is to be tuned.

Another object is to provide a device which gives an improved indication of the reasonance point and brings more forcibly to the attention of the operator the presence or the absence of resonance.

It is also an object of my invention to provide a device in which the adjustments are simplified and there is no definite zero or full scale position of the indicator.

Still another object is the use of a construction with which small changes in the position of the light source and the shape of its filament are practically without effect upon the indication.

A further object is the provision of an arrangement in which changes in magnetic or electrical characteristics of the elements of the instrument, or even partial damage to the instrument, will not destroy its usefulness.

An additional object is the use of an arrangement which overcomes the necessity for balancing the instrument.

Other and further objects and advantages will become apparent as the description proceeds.

In describing and explaining the operation of my invention, I will refer to its use as a tuning indicator for a radio set but it will be understood, of course, that I do not thereby limit my invention to any particular use.

Figure 2:
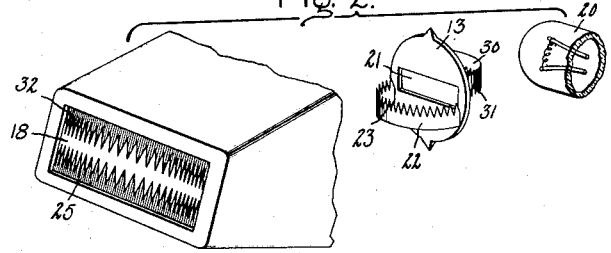
Figure 3:
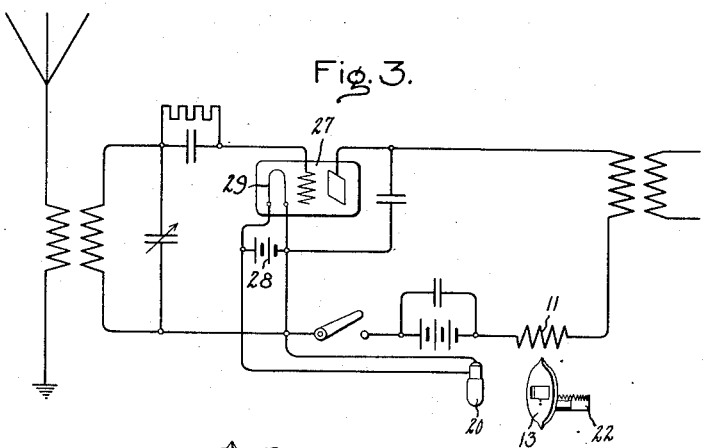
Figure 4:
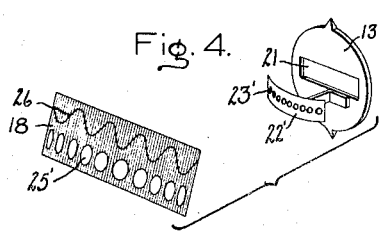

The features of my invention which I believe to be novel and patentable will be pointed out in the claims appended hereto. A better understanding of my invention itself may be obtained by referring to the following description taken in connection with the accompanying drawing in which Fig. 1 represents one embodiment of my invention in perspective and partially in section with a portion of its casing cut away; Fig. 2 is an exploded view of certain elements of a modified form of the instrument illustrated in Fig. 1; Fig. 3 is a schematic circuit diagram of the detector tube circuit of a radio receiver in which my instrument may be employed for tuning; and Fig. 4 is a partial view of another modified form of my invention.

Referring now more in detail to the drawing in which like reference characters refer to like parts throughout, the electrical instrument mechanism illustrated in Fig. 1 comprises a cylindrical coil 11, the supporting form of which is mounted on a tube 12 of brass or other non-magnetic material. A magnetic vane armature 13 is pivoted in a second tube 14 of brass or other non-magnetic material, the tube 14 telescoping into the tube 12 and being longitudinally and rotatably adjustable therein. The inner tube 14 may be split at 15 so as to expand slightly after insertion to insure a snug fit in the outer tube and prevent movement therein except when manually adjusted.

At one end of the coil 11 and supported about the tube 12 is a C-shaped permanent magnet 16, the right-hand side of which is cut away in the drawing in order to provide a sectional view. The open portion of the C-shaped magnet 16 is shown as being toward the bottom at 16a. It will be understood that the magnet 16 is symmetrical with respect to the plane cutting the section shown. The magnetic flux from the permanent magnet 16, it is evident, will tend to hold the magnetic vane 13 parallel to the plane of the magnet in the position shown in Figs. 1 and 2 when no current is flowing in the coil 11. However, if a direct current is passed through the coil 11, it will produce a magnetic field along its cylindrical axis and the vane 13 will tend to turn in alignment therewith. The direction in which the armature turns will depend, of course, upon the direction of current flow through the coil 11 since the armature is polarized by flux from the permanent magnet 16. The extent to which the armature deflects and the rapidity of its motion will, obviously, depend upon the strength of the direct current so that the deflection of the armature becomes an indication of the current direction and strength.

The instrument is mounted in a casing 17 which is substantially light-tight and is preferably darkened on its interior surface to cut down reflected light rays. The front of the casing 17 is closed by a translucent screen 18 and the back of the casing contains a small aperture 19 which permits rays of light to enter from a suitable source such as an incandescent lamp 20. The vane 13 is provided with a rectangular opening 21 so that light entering from the lamp 20 passes through the opening 21 and illuminates the translucent screen 18. A suitable form of shutter 22 provided with a plurality of preferably similar recurring formations 23 is mounted upon the movable vane 21. Preferably, the shutter 22 is mounted at a suitable distance from the axis of rotation of the vane 13 by means of a radial arm 24. The shutter 22 may be composed of translucent material, carrying suitable formations, lines or indicia composed of opaque material, or it may be composed of opaque material with portions cut away to permit the passage of light. A simple construction for the shutter 22, which I have found satisfactory, consists of an arc-shaped band of opaque sheet material having a notched or serrated edge to form a plurality of preferably similar forms such as, for example, saw teeth 23.

A shadow 25 of the shutter 22 with a serrated edge will, obviously, be cast upon the translucent screen 18. Preferably the arrangement is such that the shadow 25 extends completely across the screen 18 regardless of the angular position of the armature 13. The shadow 25 will appear to move across the screen as the magnetic vane 13 deflects, producing a continuous progression of lines or forms across the screen. In order to accentuate the appearance of motion, one or more indices may be placed in the translucent screen 18, such as, for example, a sine wave curve 26 drawn in some suitable manner as by means of opaque ink upon the back of the screen 18. If desired, the spacings between the adjacent saw teeth of the shadow 25 and between the recurring wave shapes of the curve 26 may be made different to simulate the difference in period between the audio frequency wave which the radio listener hears and the radio frequency or the intermediate stage frequency to which the radio detector circuit is made responsive.

In Fig. 3 is shown a portion of a radio receiving circuit in which the coil 11 of my tuning indicator is connected in the output circuit of a detector tube 27. If desired, the lamp 20 used to cast the shadows in my instrument may be energized from the current source 28 utilized for heating the cathode 29 of the tube 27.

It has been found that, when a radio circuit of the type illustrated is properly tuned, the direct current component flowing in the output circuit of the detector becomes a minimum and increases as the condition of resonance is departed from in either direction. However, when the receiver is adjusted to a setting some distance from the point of resonance, or, of course, when the receiver is turned off, the direct current component is also a minimum or zero. The high frequency alternating current components in the detector circuit have been found not to affect the direct current measuring instrument.

The method of tuning a radio receiver with my tuning instrument is to adjust the tuning dial until the shadow forms start moving across the screen, then to bring the tuning dial back until the shadow forms return and come to rest, indicating a minimum current is flowing in the instrument.

When the radio receiver is turned on and the tuning dial is moved toward the setting for resonance for the purpose of bringing in a signal on a predetermined radio frequency, a direct current will flow in the output circuit of the detector and in the coil 11 so that the magnetic vane 13 and the shutter 22 will be deflected. Deflection will be made apparent to the operator by the passage of the progression of saw-tooth shadow forms 25 across the face of the translucent screen 18. If the operator continues to move the tuning dial through the point of resonance, the current through the coil 11 will drop to zero or to a minimum when the resonance point is reached and then rise again, causing the movable element to return to its neutral position and then move upward again, and causing the direction of motion of the shadow band 25 to reverse twice. The operator is thereby apprised of the fact that he has passed through the point of resonance and he will turn back the tuning dial an amount sufficient to cause the shadow band to move downward and remain at rest.

The expressions "upward" and "downward" are merely relative and are used to designate the directions which would correspond to upscale and downscale deflections, respectively, in an instrument having a scale and pointer.

If the shadow band remains at rest, after moving downward, the indication is given that the condition of resonance has been obtained. However, if it continues to deflect after the adjustment of the tuning dial is discontinued, or if it stops after moving upward, it is apparent that a further adjustment is necessary to obtain resonance. Inasmuch as the rapidity of the motion of the saw-tooth shadow 25 depends upon the strength of the direct current flowing in the winding 11, which in turn depends upon the departure from the condition of resonance, the operator is apprised of the amount of adjustment required to bring the radio receiver into resonance and without effort quickly learns to make the proper adjustment initially.

Owing to the peculiarity of the human eye which makes it more sensitive to motion than to shapes or positions of stationary objects, my device in which the indications depend upon the existence and stoppage of motion may be successfully used even by an inattentive operator, and the device may be used more easily than prior devices since it is not necessary to rivet the attention upon the indicator. If any part of the series of shadow forms comes within even the extreme outer edges of the angle of vision of the operator, indications are obtained since the eye is particularly sensitive to changes in motion of objects just beyond the conscious field of view.

Since the indication of resonance is produced by the shadow forms coming to rest rather than by reaching a given position on a scale, variations in the minimum direct current component which might be produced by great variations in signal strength do not have any effect upon the process of tuning. Likewise, since there are no zero and full scale positions of the instrument, its adjustment during the process of manufacture is very much simplified, it need not be balanced, changes in electrical or magnetic characteristics of the materials employed in the instrument will not diminish its usefulness, and even partial damage such as a shorting of some of the turns of the winding 11 will have no serious consequence.

Although I have described the operation of my invention in connection with a type of radio receiver in which resonance occurs when the direct current component of current in a certain part of the circuit is a minimum, it will be understood that my invention is not limited thereto but may also be carried out in connection with other types of instruments, in connection with radio apparatus in which resonance occurs simultaneously with a maximum in the value of an alternating or a direct current component, or in connection with other apparatus.

Fig. 4 represents another form of my invention in which light spots 25' instead of shadow forms are projected upon the screen 18, by employing an opaque screen 22' having suitable apertures 23'.

If desired, instead of providing a stationary index on the translucent screen 18 to provide a point of reference for the motion of the sawtooth shadow 25, I may modify the arrangement so that the deflection of the movable element itself produces a pair of saw-tooth shadows or other characteristic forms upon the screen 18 traveling in opposite directions. For example, in the arrangement of Fig. 2, a second arc-shaped shutter 30, provided with a serrated edge 31 but with the serrations pointed down, is mounted upon the movable vane 13 on the side opposite the shutter 22. The shutter 30, obviously, casts a saw-tooth shadow 32 on the translucent screen 18 with the points pointing down and appearing along the opposite edge of the screen 18 from the saw-tooth shadow 25. Both shadows 25 and 32 will travel across the screen but in opposite directions so that the apparent rapidity of the motion is doubled, thereby increasing the sensitivity of the device.

In accordance with the provisions of the patent statutes, I have described the principle of operation of my invention together with the apparatus which I now believe to represent the best embodiment thereof, but desire to have it understood that the apparatus shown and described is only illustrative and that my invention may be carried out by other arrangements.

What I claim as new and desire to secure by Letters Patent of the United States, is:

1. An instrument comprising a source of light, a current responsive movement carrying a shutter having a plurality of recurring identical formations therein and a translucent screen, the formations on said shutter being projected on said translucent screen and passing across the face of said screen in response to deflection of said movement but being substantially unchanged in appearance for different positions of rest of said movement.

2. An instrument comprising in combination, a current responsive mechanism having a movable element, a source of light, a screen, and a shutter between said light source and said screen mechanically connected to said movable element and including a plurality of substantially evenly spaced identical forms serving to cast their images on said screen which appear to travel across said screen as said movable element deflects in response to variations in current.

3. An indicating instrument comprising in combination, a stationary element, a movable element, a source of light, a screen illuminated by said source of light, and a shutter mechanically connected to said movable element interposed between said light source and said screen and having a plurality of evenly spaced openings therein whereby a plurality of light and shadow forms is projected on said screen which appear to travel thereacross as said movable element is deflected.

4. An instrument comprising a cylindrical coil, a C-shaped permanent magnet at one end and coaxial with said coil, a circular magnetic vane armature pivoted within said coil on an axis at right angles to the coil axis, said armature having an opening extending across the central portion thereof at right angles to its axis of rotation, an arcuate shutter having a notched edge approximately level with the opening in said vane, said shutter being mounted upon said armature substantially coaxial with its axis of rotation, a light source on one side of said armature, and a translucent screen on the opposite side of said armature so arranged that the shutter casts a notched-edge shadow across a portion of the screen which travels along the screen as said armature deflects.

5. An instrument comprising a cylindrical coil, a C-shaped permanent magnet coaxial with said coil, a light source and a translucent screen on opposite sides of said coil such that light may shine through the cylindrical coil on to said screen, a magnetic vane armature pivoted within said coil on an axis of rotation at right angles to the axis of the coil, said armature having a window in its center, the armature serving to cut off light between the light source and screen except that which passes through the window, and a shutter provided with recurring formations mounted in front of and displaced from said window, serving to project images of said formations traveling across said screen as the armature is turned.

6. A tuning instrument having an energizing coil and a rotatable armature biased to a central position but rotatable in opposite directions from said position in response to the magnitude and direction of direct current flowing in said coil, a light source, a translucent screen, and shutter means including a plurality of like forms rotated with said armature and located between said light source and screen to produce a recurring shadow effect traveling across said screen as the armature is turned to produce a visual indication of the process of tuning.

7. In a radio receiver with a discharge tube detector circuit therefor, a tuning indicator comprising in combination a current responsive mechanism having a current-conducting winding adapted to be included in said circuit, a screen and means associated with said mechanism for projecting a succession of substantially evenly spaced like forms on said screen, traveling thereacross in response to variations in current in said current-conducting winding.

8. An indicator for variations in current comprising a current responsive mechanism, a screen on which images may be projected, and a source of light, said current responsive mechanism including a movable element located between said light source and said screen and carrying on either side of its axis of rotation a pair of shutters having formations thereon serving to project upon said screen two groups of images traveling along said screen in opposite directions as said movable element is deflected, the formations of either shutter being substantially evenly spaced and each formation being substantially like the remaining formations on the same shutter.

9. A radio tuning indicator comprising in combination, a source of light, a screen and a current-responsive movable element therebetween carrying a shutter having a wave-shaped formation therein in which individual shapes recur at substantially equal intervals with relatively high frequency, serving to cast a wave-like image on said screen, said screen having marked thereon a wave formation of relatively low frequency, whereby a high frequency wave appears to travel along said screen and along said low frequency wave markings in response to variations in current, said high and low frequency waves simulating a high frequency wave and an audio frequency wave, respectively, in a radio receiver with which the indicator may be used.

RALPH G. AREY.